(12) United States Patent
Pecherer

(10) Patent No.: US 7,548,935 B2
(45) Date of Patent: Jun. 16, 2009

(54) METHOD OF RECURSIVE OBJECTS FOR REPRESENTING HIERARCHIES IN RELATIONAL DATABASE SYSTEMS

(76) Inventor: Robert Pecherer, 451B Camino Don Miguel, Sante Fe, NM (US) 87505

( * ) Notice: Subject to any disclaimer, the term of this patent is extended or adjusted under 35 U.S.C. 154(b) by 0 days.

(21) Appl. No.: 10/428,594

(22) Filed: May 2, 2003

(65) Prior Publication Data

US 2004/0083222 A1 Apr. 29, 2004

Related U.S. Application Data

(60) Provisional application No. 60/379,088, filed on May 9, 2002.

(51) Int. Cl.
*G06F 17/30* (2006.01)

(52) U.S. Cl. .............. 707/103 R; 707/103 Z; 707/100

(58) Field of Classification Search ............ 707/1–10, 707/100–104.1, 200–202; 709/215–218; 345/968; 715/513; 705/1–2, 26–27
See application file for complete search history.

(56) References Cited

U.S. PATENT DOCUMENTS

| | | | |
|---|---|---|---|
| 5,201,046 A | | 4/1993 | Goldberg et al. |
| 5,291,583 A | | 3/1994 | Bapat |
| 5,295,256 A | | 3/1994 | Bapat |
| 5,295,261 A | | 3/1994 | Simonetti |
| 5,379,419 A | * | 1/1995 | Heffernan et al. ............. 707/4 |
| 5,454,101 A | * | 9/1995 | Mackay et al. ................ 707/3 |
| 5,467,471 A | | 11/1995 | Bader |
| 5,474,407 A | * | 12/1995 | Rodel et al. ................. 408/227 |
| 5,499,371 A | | 3/1996 | Henninger et al. |
| 5,504,885 A | | 4/1996 | Alashqur |
| 5,504,886 A | | 4/1996 | Chang et al. |
| 5,557,788 A | | 9/1996 | Inoue |
| 5,581,756 A | * | 12/1996 | Nakabayashi ................ 707/2 |

(Continued)

FOREIGN PATENT DOCUMENTS

GB 2368427 A * 5/2002

(Continued)

OTHER PUBLICATIONS

Oracle Server application developer's Guide, release 7.3, Feb. 1996, pp. 4-16 through4-18; chapter 6-7, pp. 6-1 through 6-29; pp. 7-1 though 7-3; chapter 11, pp. 11-1 though 11-10.*

(Continued)

*Primary Examiner*—Neveen Abel Jalil
*Assistant Examiner*—Christyann R Pulliam
(74) *Attorney, Agent, or Firm*—Caesar, Rivise, Bernstein, Cohen & Pokotilow, Ltd.

(57) ABSTRACT

A method is described for creating and managing a two-level hierarchical data structure. Parent and child object relation tables, an aggregate relation table and a link relation table having records are created wherein each link relation record has an aggregate identity field and a child object identity field and the aggregate relation records have a parent object identity field pointing to a parent object relation record. The link relation records have an aggregate identity field pointing to an aggregate relation record and to a child object relation record whereby zero or more child object relation records are linked to a parent object record relation record.

2 Claims, 19 Drawing Sheets

U.S. PATENT DOCUMENTS

| | | | |
|---|---|---|---|
| 5,596,746 A | | 1/1997 | Shen et al. |
| 5,627,979 A * | | 5/1997 | Chang et al. ............... 345/763 |
| 5,706,504 A | | 1/1998 | Atkinson et al. |
| 5,724,577 A | | 3/1998 | Exley et al. |
| 5,737,591 A * | | 4/1998 | Kaplan et al. ................. 707/1 |
| 5,764,973 A | | 6/1998 | Lunceford et al. |
| 5,774,692 A | | 6/1998 | Boyer et al. |
| 5,799,310 A | | 8/1998 | Anderson et al. |
| 5,930,806 A * | | 7/1999 | Taira et al. .................. 707/204 |
| 5,974,407 A * | | 10/1999 | Sacks ............................ 707/2 |
| 6,006,233 A | | 12/1999 | Schultz |
| 6,009,432 A | | 12/1999 | Tarin |
| 6,047,284 A | | 4/2000 | Owens et al. |
| 6,055,540 A | | 4/2000 | Snow et al. |
| 6,064,999 A * | | 5/2000 | Dalal ............................ 707/2 |
| 6,085,188 A * | | 7/2000 | Bachmann et al. ............. 707/3 |
| 6,134,543 A | | 10/2000 | Witkowski et al. |
| 6,154,213 A * | | 11/2000 | Rennison et al. ........... 715/854 |
| 6,163,776 A | | 12/2000 | Periwal |
| 6,175,836 B1 * | | 1/2001 | Aldred .................. 707/103 R |
| 6,192,373 B1 | | 2/2001 | Haegele |
| 6,208,990 B1 | | 3/2001 | Suresh et al. |
| 6,212,524 B1 * | | 4/2001 | Weissman et al. ........... 707/101 |
| 6,236,988 B1 * | | 5/2001 | Aldred .......................... 707/3 |
| 6,374,252 B1 | | 4/2002 | Althoff et al. |
| 6,381,600 B1 | | 4/2002 | Lau |
| 6,405,208 B1 * | | 6/2002 | Raghavan et al. ........... 707/102 |
| 6,427,123 B1 * | | 7/2002 | Sedlar ............................ 702/2 |
| 6,480,857 B1 * | | 11/2002 | Chandler .................... 707/100 |
| 6,502,098 B2 | | 12/2002 | Lau |
| 6,505,205 B1 * | | 1/2003 | Kothuri et al. .............. 707/100 |
| 6,571,231 B2 * | | 5/2003 | Sedlar ............................ 707/1 |
| 6,578,038 B1 * | | 6/2003 | Haegele ...................... 707/100 |
| 6,625,615 B2 * | | 9/2003 | Shi et al. ................ 707/103 R |
| 6,687,704 B1 * | | 2/2004 | Russell ....................... 707/100 |
| 6,704,744 B1 * | | 3/2004 | Williamson et al. ......... 707/101 |
| 6,704,802 B1 * | | 3/2004 | Finch et al. .................. 719/315 |
| 6,754,666 B1 * | | 6/2004 | Brookler et al. ............. 707/102 |
| 6,768,986 B2 * | | 7/2004 | Cras et al. ....................... 707/2 |
| 6,853,997 B2 * | | 2/2005 | Wotring et al. .............. 707/100 |
| 6,965,903 B1 * | | 11/2005 | Agarwal et al. ........... 707/104.1 |
| 6,983,288 B1 * | | 1/2006 | Kirkwood et al. ....... 707/103 R |
| 2001/0013030 A1 * | | 8/2001 | Colby et al. .................... 707/1 |
| 2001/0049682 A1 * | | 12/2001 | Vincent et al. .............. 707/100 |
| 2002/0029207 A1 * | | 3/2002 | Bakalash et al. ................ 707/1 |
| 2002/0099692 A1 * | | 7/2002 | Shah et al. ...................... 707/2 |
| 2002/0129017 A1 * | | 9/2002 | Kil et al. ........................ 707/6 |
| 2002/0194167 A1 * | | 12/2002 | Bakalash et al. ................ 707/3 |
| 2002/0194201 A1 * | | 12/2002 | Wilbanks et al. ......... 707/104.1 |
| 2002/0198885 A1 * | | 12/2002 | Streepy, Jr. ................. 707/100 |
| 2003/0004959 A1 * | | 1/2003 | Kotsis et al. ................ 707/100 |
| 2003/0065659 A1 * | | 4/2003 | Agarwal et al. ................ 707/4 |
| 2003/0110150 A1 * | | 6/2003 | O'Neil et al. ................... 707/1 |
| 2003/0120651 A1 * | | 6/2003 | Bernstein et al. ............... 707/6 |
| 2004/0049506 A1 * | | 3/2004 | Ghouri .......................... 707/5 |
| 2004/0181518 A1 * | | 9/2004 | Mayo et al. .................... 707/3 |
| 2005/0027743 A1 * | | 2/2005 | O'Neil et al. ............ 707/104.1 |

FOREIGN PATENT DOCUMENTS

| | | | | |
|---|---|---|---|---|
| WO | WO 92/15066 | * | 9/1992 | |
| WO | WO 2005/050481 | * | 6/2005 | .................... 17/30 |
| WO | WO 2006053243 | * | 5/2006 | .................... 17/30 |

OTHER PUBLICATIONS

R.Pieringer et al. "transbase: A leading-edge ROLAP engine supporting multidimensional indexing and hierarchy clustering", 2003, 20 pages.*

Stephen Chong et al. "static analysis of accessed regions in recursive data structures", Jun. 2003, 22 pages.*

Lazysoft technology, Lazyview: database aggregation capability, White paper, 2003pp. 1-4.*

Yanhong A.Liu et al. "program optimization using indexed and recursive data structures,", proceedings of the ACM SIGPLAN, 2002, 11 pages.*

Shamkant B Navathe, "Evolution of data modeling for databases", communications of the ACM, vol. 33, No. 9, Sep. 1992, pp. 112-123.*

Bob Cohen, Sense Corp, "the aggregate awareness decision", 2001 business objects international user conference, Oct. 2001, pp. 1-27.*

J.H.TER Bekke et al., "content-driven specifications for recursive project planning applications", proceedings of the IASTED international conference Applied informatics, Feb. 2002, pp. 448-452.*

Haxiun Wang et al. "the ATLaS system and its powerful database langue based on simple extentions of SQL", proceedings of the 18th international conference on data engineering, 2002 IEEE pp. 1-2.*

Peter Dinda, "a unified relational approach to grid information services", Feb. 200118 pages.*

Guozhu Dong et al. "incremental maintenance of recursive views using relational calculus/SQL", SIGMOD record 29(1): 44-51, Mar. 2000, pp. 1-8.*

P.Fitsilis et al. "producing relational database schemata from an object oriented design", IEEE 1994, pp. 251-257.*

Mark O Aldrich, "a methodology for the use of single level RDBMS software in a multi-level secured system", IEEE 1993, pp. 11-20.*

* cited by examiner

```
/* Define ParentObject Relation: */ create table parentOBject (
     parentOB_id              int         primary key,
     parentOB_objectName  char(255) not null,
          .
          .
          .
)

/* Define ChildObject Relation: */ create table childOBject (
     childOB_id               int         primary key,
     childOB_objectName   char(255) not null,
          .
          .
          .
)

/* Define Aggregate relation: */ create table AGGregate (
     AGG_id             int        identity(1,1)   primary
key,
     AGG_parentOB_id         int         not null
                             references
                             parentOBject(parentOB_id)
)

/* Define Link relation: */ create table LiNK (
    LNK_AGG_id               int        not null
                             references AGGregate(AGG_id),
    LNK_childOB_id           int        not null
                             references childOBject(childOB_id)
```

Fig. 2

```
create table Team(
     Team_Id          int         identity(1,1)  primary key,
     Team_Name        char(255)   not null       unique,
     Team_City        char(64),
     Team_Mascot      char(64)
)

create table Player(
     Player_Id          int         identity(1,1) primary
key,
     Player_Name              char(255) not null    unique,
     Player_DateOfBirth datetime,
     Player_PlaceOfBirth char(64)
)

create table TeamPlayerAggregate(
     TPA_Id           int  identity(1,1)  primary key,
     TPA_aggregateName   char(255) not null   unique,
     TPA_Team_Id         int  not null  references
Team(Team_Id)
)

create table TeamPlayerLink(
     TPL_Id         int  identity(1,1)  primary key,
     TPL_TPA_Id         int   not null
                    references
                    TeamPlayerAggregate(TPA_id),
     TPL_Player_Id  int   not null
                    references Player(Player_Id)
)
```

Fig. 3

PLAYER relation:

| Player_Id | Player_Name | Player_DateOfBirth | Player_PlaceOfBirth |
|---|---|---|---|
| 100 | Don Jones | 8-29-75 | Des Moines, Iowa |
| 101 | Dave Jones | 8-29-75 | Des Moines, Iowa |
| 107 | Richard Smith | 3-25-71 | Belen, New Mexico |
| 109 | Jerry Thomas | 4-1-70 | Fayetteville, Arkansas |
| 110 | Larry Collier | 10-20-72 | Davis, California |
| 111 | Harry Collier | 5-30-74 | Santa Cruz, California |
| 115 | Bill Martin | 7-12-69 | Portland, Oregon |

TeamPlayerAggregate relation:

| TPA_Id | TPA_aggregateName | TPA_Team_Id |
|---|---|---|
| 1000 | Mudhens Roster | 1 |
| 2000 | Mighty Ducks Roster | 2 |
| 3000 | All Stars | 3 |

TeamPlayerLink relation:

| TPL_Id | TPL_TPA_Id | TPL_Player_id |
|---|---|---|
| 180 | 1000 | 100 |
| 181 | 1000 | 101 |
| 182 | 1000 | 107 |
| 183 | 1000 | 109 |
| 184 | 2000 | 110 |
| 185 | 2000 | 111 |
| 186 | 2000 | 115 |
| 200 | 3000 | 101 |
| 201 | 3000 | 107 |
| 202 | 3000 | 115 |

Fig. 4

```
create table League(
     League_Id          int           identity(1,1)   primary key,
     League_Name        char(255) not null   unique,
     League_President   char(64)
)
create table LeagueTeamAggregate(
     LTA_Id             int           identity(1,1)   primary key,
     LTA_aggregateName  char(255) not null               unique,
     LTA_League_Id      int           not null
                                      references League(League_Id)
)
create table LeagueTeamLink(
     LTL_Id             int    identity(1,1)   primary key,
     LTL_LTA_Id                int   not null
                               references
                        LeagueTeamAggregate(LTA_Id),
     LTL_Team_Id        int    not null
                               references Team(Team_Id)
)
```

Fig. 6

League relation:

| League_Id | League_Name | League_President |
|---|---|---|
| 10101 | Houston City League | Al Barker |

League-Team Aggregate relation:

| LTA_Id | LTA_aggregateName | LTA_League_Id |
|---|---|---|
| 10000 | Houston City League Teams | 10101 |

League-Team Link relation:

| LTL_Id | LTL_LTA_Id | TPL_Team_Id |
|---|---|---|
| 2180 | 10000 | 1000 |
| 2181 | 10000 | 2000 |

Fig. 7

```
/* Define Object Relation: */
create table OBject (
    OB_id             int  identity(1,1)  primary key,
    OB_objectName     varchar(255)    not null,
        .
        .
        .
)
/* Define Aggregate Relation: */
create table AGGregate (
    AGG_id            int   identity(1,1)  primary key,
    AGG_aggregateName varchar(255)    not null   unique,
    AGG_parentOB_id   int   not null
                      references OBject(OB_id)
)
/* Define Link Relation: */
create table LiNK (
    LNK_id            int   identity(1,1)  primary key,
    LNK_AGG_id        int   not null   references
AGGregate(AGG_id),
    LNK_childOB_id int  not null
                      references OBject(OB_id)
)
```

FIGURE 10: SQL statements to define the three relations of Alternate Embodiment #1.

```
create table Employee(
     EmployeeId      int       identity(1,1)  primary key,
     EmployeeName    char(50)  not null                  unique,
     EmployeePhone   char(12)  not null
)
create table Group(
     GroupId         int  identity(1,1)  primary key,
     GroupName       char(50)  not null                  unique,
     GroupLeader     int  references Employee(EmployeeId)
)
create table Link(
     LinkId          int  identity(1,1)  primary key,
     LinkToGroup     int  references Group(GroupId)
     LinkToMember    int  references Employee(EmployeeId)
)
```

Fig. 11 table Employee:

| EmployeeId | EmployeeName | EmployeePhone |
|---|---|---|
| 1 | Bob Jones | 123-456-7890 |
| 2 | John Smith | 234-567-8901 |
| 3 | Jane Smith | 345-678-9012 |
| 4 | Bill Adams | 456-789-0123 |
| 5 | Tom Booth | 567-890-1234 |
| 6 | Hank Cox | 678-901-2345 |
| 7 | Dana Fox | 789-012-3456 |
| 8 | Hal Brown | 890-123-4567 |
| 9 | Ivan Leeds | 901-234-6789 | table Group:

| GroupId | GroupName | GroupLeader |
|---|---|---|
| 101 | Management | 1 |
| 102 | Personnel | 2 |
| 103 | Engineering | 3 |
| 104 | Manufacturing | 4 |
| 105 | Quality Assurance | 5 | table Link:

| LinkId | LinkToGroup | LinkToMember |
|---|---|---|
| 1001 | 101 | 2 |
| 1002 | 101 | 3 |
| 1003 | 101 | 4 |
| 1004 | 102 | 5 |
| 1005 | 102 | 6 |
| 1006 | 103 | 7 |
| 1007 | 104 | 8 |
| 1008 | 105 | 9 |

Fig. 12

```
/* Define ObjectType Relation: */
create table OBJectType(
    OBT_id              int     identity(1,1)       primary key clustered,
    OBT_objectTypeName  char(100)                   not null    unique
)
/* Define LinkType Relation: */
create table LiNKType(
    LNKT_id             int     identity(1,1)       primary key clustered,
    LNKT_linkTypeName   char(100)                   not null    unique
)
/* Define AggregateType Relation: */
create table AGGregateType(
    AGGT_id                     int identity(1,1) primary key clustered,
    AGGT_aggregateTypeName      char(100) not null unique,
    AGGT_parentOBT_id   int     not null references OBjectType(OBT_id),
    AGGT_childOBT_id    int     not null references OBjectType(OBT_id),
    AGGT_LNKT_id        int     not null references LiNKType(LNKT_id)
)
/* Define Object Relation: */
create table OBject (
    OB_id               int     primary key,
    OB_OBT_id           int     not null    reference OBjectType(OBT_id),
    OB_objectName   char(100)   not null,
        .
        .
        .
    )
/* Define Aggregate Relation: */
create table AGGregate (
    AGG_id              int     identity(1,1)       primary key,
    AGG_AGGT_id         int     not null
                                references AGGregateType(AGGT_id),
    AGG_aggregateName   char(100)   not null    unique,
    AGG_parentOB_id     int     not null
                                references parentOBject(parebtOB_id)
)
/* Define Link Relation: */
create table LiNK (
    LNK_id          int     identity(1,1)       primary key,
    LNK_LNKT_id         int     not null    references LiNKType(LNKT_id),
    LNK_AGG_id          int     not null    references AGGregate(AGG_id),
    LNK_childOB_id int      not null    references childOBject(childOB_id)
)
```

Fig. 15

METHOD OF RECURSIVE OBJECTS FOR REPRESENTING HIERARCHIES IN RELATIONAL DATABASE SYSTEMS

RELATED APPLICATIONS

This is a utility application based upon provisional application Ser. No. 60/379,088, filed on May 9, 2002, entitled "Method Of Recursive Objects For Representing Hierarchies In Relational Database Systems." Applicant hereby claims for this utility application the benefit of the filing date of the provisional application whose entire disclosure is incorporated by reference herein.

CROSS-REFERENCE TO RELATED APPLICATIONS

Not applicable.

BACKGROUND

1. Field of Invention

The present invention relates generally to computer database systems and particularly to relational database systems and methods for storing and retrieving hierarchical data structures.

2. Description of Prior Art

A DataBase is a collection of stored operational data used by the application systems of some particular enterprise. [Date, 1986] A DataBase Management System (DBMS) is computer software that provides secure, reliable, shared access to databases whose integrity is assured via transaction processing and mechanisms for backup and recovery of databases in the presence of accidental or intentional disruption.

Note: The term "database" has become widely used and in many cases associated with any collection of data, organized or not. In this application, I use the term written as "DataBase" to distinguish between imprecise notions of a database as any collection of data and a DataBase as a collection of data with an organization that reflects an operational model for the applications which use it. The more formal notion will be regarded as consistent with usage by persons skilled in the pertinent art of database design and applications development.

As is well understood in the art, the interactive DBMS user or programmer of DBMS applications interacts with the DBMS through a logical data model. That model represents an organization of all data into structured records, structured records into collections, and defined relationships between and among the records collections. The DBMS maintains a single, unified physical model of data storage and maps actions on one or more logical data models to this underlying physical model.

The Prior Art includes DBMSs which support logical data models of at least four types: Hierarchical, Network, Relational and Object-Oriented.

The building block of the Hierarchical Data Model is a two level one-to-many hierarchy between one parent record of a parent record class P and zero or more child records of a child record class C. A child record in a two level P-C hierarchy may be the parent record in another two level C-G hierarchy with parent class C and child class G. When viewed in this way, the composition of these two level hierarchies is a three level hierarchy over the classes P, C and G. By extension, hierarchies of any number of levels may be defined and populated with data. For example, a hierarchy over the classes State, County, Municipality, District, Street and Address could be used to create a six level hierarchy over every addressable building in the United States. Hierarchical DataBase Management Systems (HDBMS) implement the Hierarchical Data Model via languages for defining and populating logical hierarchies and for logically navigating over hierarchies to retrieve, modify and delete existing records. IBM's IMS, one of the first commercial DBMS products conforms to a Hierarchical Data Model.

The Network Model is similar to the Hierarchical Model, but uses the equivalent construction of a Set [CODASYL, 1969, 1971] to represent the simplest one-to-many relationship with Set Owner and Set Member(s) in the roles of hierarchical parent and child(ren). A DBMS based on the Network Model provides language constructs for defining, populating and navigating over these Sets. The commercial product ADABAS is based on the Network Model.

The Relational Model presents an entirely different logical representation as a collection of relational tables, also called relations. A relation is a collection of related objects, each object represented by one record (row) of a relation (table). In relational terminology, the terms relation and table are used interchangeably. However the definition of a relation is derived from a more formal, mathematical characterization, and relations in Relational DataBases are more restricted in their specification and use than tables. The rows of a relational table are referred to as tuples, rows or records and represent objects. Unlike the hierarchical and network models, relationships between records in different relations are not explicitly represented, but are materialized by the Relational DBMS (RDBMS) in response to requests for service called queries. Queries are expressed in a query language. The most popular and standardized for the Relational Model is Structured Query Language, or SQL. An SQL query defines a response relation in terms one or more relations in the Relational DataBase. The RDBMS treats the query as a request and materializes the response relation by accessing the physical storage of the referenced relations. In effect, an SQL query defines a relation and a RDBMS materializes the defined relation. An RDMBS typically provides both an interactive end user interface and a programmatic (or "call") interface. The interactive interface simply materializes all response records. The call interface also includes programming language functions for navigating backwards and forward through the set of response records. Note that individual relations act as containers, and that relationships between these containers are not explicitly represented.

Object-Oriented (OO) DataBase Management Systems (OODBS) support the same generic modeling capability that characterizes and has popularized Object-Oriented Programming Languages like ADA [Booch, 1983] and C++ [Lippman, 1991]. From the perspective of an application written in an OO programming language, an OODB (Object-Oriented DataBase) provides storage for data that are activated (retrieved) as needed and passivated (stored back to the DataBase) when no longer needed. Navigation is implicit in the relationships between and among object types, so that actual OODB access requires very little additional skill beyond the ability to program in these languages. This natural fit between Object-Oriented Programming Languages and Object-Oriented DataBase Management Systems makes the latter especially valuable in environments characterized by a heavy software development workload and the requirement of large volumes of shared, persistent data.

Historically, the first DBMSs commercially available were based on the Hierarchical and Network models. These products were introduced in the late 1950s and early 1960s. The Relational Model of Data was introduced in a seminal paper in 1970 by E. F. Codd [Codd, 1970]. The Relational approach to databases touched off a revolution in database research and development. The first experimental RDBMSs were developed in the middle 1970's: IBM's System R [Astrahan,1976] and INGRES [Stonebraker,1976]. By the late 1970's, commercial RDBMS products like Oracle, Sybase and IBM's DB2 became available. Sales growth for RDBMSs exploded and relational technology became the dominant technology in new business, scientific and engineering applications. Hierarchical and Network DBMSs continued to be used, though mainly in legacy systems.

In the mid 1980's, growth in the popularity of Object-Oriented Programming Languages for applications development leveraged growth in the Object-Oriented segment of the DBMS market. It appeared that OODBMS technology might displace RDBMS technology just as RDBMS technology had supplanted the earlier hierarchical and network technologies. That did not in fact occur. For enterprises that have developed large DataBases and devote major expense to applications development, Object-Oriented Programming Languages have proven to be more cost effective than earlier software development approaches, and many of these organization continue to use OODBMSs. However, for reliable data management, RDBMSs and the relational approach consistently dominate the market for commercial DBMSs. Some OODBMS vendors implement an Object-Oriented data model using an RDBMS, thus offering the best of both worlds: Efficient software development against an OO logical model and the reliability and flexibility of the relational model for database management and preservation of these valuable assets.

The value of large data collections can almost always be enhanced through use of a DBMS, and the Relational DBMS is the overwhelming choice for business, science and engineering. Many data management applications are well matched to the tabular view of data provided by the relational model of data provided by an RDBMS. But many others are far easier to approach when the data can be organized hierarchically. Because RDBMSs are widely available and provide such high levels of security and reliability, several innovators have attempted to develop techniques for representing hierarchies and other related data structures using Relational DataBases and the SQL query language. The Prior Art for such techniques includes the following:

Goldberg et. Al. [U.S. Pat. No. 5,201,046, 1993] describe a "method for storing, retrieving and modifying directed graph data structures" using an RDBMS. A hierarchy is a restricted case of a directed graph, so that a directed graph technique could also be used to represent hierarchies in a RDB. The approach extends the SQL query language with two new languages constructs ("EXPAND" and "DEPTH <N>") and a new data type ("REFERENCE") to represent a pointer from a record in one relation to a record in a second (possibly the same) relation.

Simonetti [U.S. Pat. No. 5,295,261, 1994] describes a "Hybrid database structure linking navigational fields having a hierarchical database structure to informational fields having a relational database structure". In this method, that portion representing the hierarchical database structure is contained in a topological map stored as a file external to the relational database.

Sacks [U.S. Pat. No. 5,974,407, 1999] describes a "Method and apparatus for implementing a hierarchical database management system (HDBMS) using a relational database management system (RDBMS) as the implementing apparatus". The method employs the Relational DataBase as a virtual (mechanical) means for implementing a Hierarchical DataBase Management System (HDBMS). The schema of the individual hierarchical tables, the permissible parent-child relationships in the Hierarchical DataBase, the definitions of subset views and the actual representation of an individual hierarchy is captured in five relations. A sixth relation makes it possible to store multiple hierarchies in the same Hierarchical DataBase. Access to the underlying Relational DataBase Management Systems and other Relational DataBases are allowed, but the hierarchical data itself cannot be correctly interpreted via the SQL mechanism without the interface specified in the patent implemented in an appropriate programming language.

Jagadish [Jagadish, 1989] describes a method for "Incorporating Hierarchy in a Relational Model of Data," but his method requires extensions to the SQL query language and a new data type.

Millett [Millett, 2001] provides two methods for "Accommodating Hierarchies in Relational Databases". The first (Path approach) involves the use of a "navigation bridge table" relation that stores all pairwise parent-child links of a hierarchy. The second (Denormalized Unit Table approach) is suitable only where the maximum number of levels in the hierarchy is known a priori. In this method, a data record in a relation that participates in a hierarchy includes pointers to each of its ancestors.

Finally, note the industry standard for the SQL query language, ANSI/ISO/IEC 9075-2-1999 [ISO/SQL, 1999]. The most recent update to this standard includes a "WITH RECURSIVE ORG" statement which defines an operation for retrieving the transitive closure of a directed graph over a hierarchy of relations and the computation of aggregate values over elements of that hierarchy. This standardized extension to the SQL query language indicates interest in representing directed graphs (digraphs) in Relational DataBases, but the feature is not widely available in commercial RDBMS products and is restricted to a style of hierarchical representation in which pointers to parents are stored within data records. Implicitly, this limits a record in a relation to participate only in as many hierarchies as the number of fields defined for that purpose. The reason for this limit is as in Millett, above: Because one record field is required for each hierarchy within which the record participates, the number of such hierarchies must be known when the schema is defined, before any records are inserted into the hierarchy.

All Prior Art techniques suffer from one or more of the following limitations:

Limitation 1: Use of non-SQL language extensions, or non-native data types, or both. Modifications to SQL or addition of non-trivial data types is not permitted by commercial products. This is because non-SQL language extensions imply the addition of internal search mechanisms, and, non-native data types cannot be correctly interpreted by a standard RDBMS. Goldberg introduces the "REFERENCE" data type and the EXPAND and DEPTH <N>language constructs to SQL. Sacks employs composite keys and a front end interface to interpret them. Applications which conform to SQL standards are portable; applications which introduce language extensions and/or non-native data types are not. This limitation eliminates one of the primary advantages for using a standard RDBMS to implement hierarchies.

Limitation 2: Use of external data structures to represent the hierarchies. RDBMSs only support relations as containers for data records. There are no other storage structures. The use of external data structures (typically in files) implies that the security, protection, backup/recovery and overall integrity that the RDBMS provides for relations is not available. Simonetti uses an external topological map to represent the hierarchical structure.

Limitations 3: Prohibition against arbitrary hierarchies limits applicability. The Millett Denormalized Unit Table Approach requires a priori knowledge of the maximum number of levels in a hierarchy. The Millett Path Table Approach can only represent a single hierarchy. For multiple hierarchies, each requires a separate Path Table. In applications where entire hierarchies are manipulated (combined or deleted for example), there are no obvious methods for treating subhierarchies as attachable/detachable units. Any technique in which parent- and/or child pointers are included in data relations implicitly limits the number of hierarchies in which the records of that relation can participate and reduces the generality of the approach.

Limitation 4: The Relational representation of records in the hierarchies is proprietary. That is, it is subject to correct interpretation only by specialized interface software. As a consequence, such data cannot also be accessed and correctly interpreted by the interactive user or programmed application via the conventional SQL interface to the RDBMS. The Sacks method suffers from this limitation.

Limitation 5: The implementation is too complex for all but the most skilled practitioners of relational database art. Simonetti and Sacks both require extensive front-end development. The Miller/Path approach involves the INNER JOIN operator which is not understood by most SQL programmers.

In contrast, the current invention is entirely implemented within a standard Relational DataBase Management System with no language extensions to the standard SQL query language, no new data types and no specialized front end interface. Unlike Goldberg, Sacks and Jagadish, the current invention is portable across all SQL compliant RDBMSs. The current invention employs no external data structures or files, so that all benefits of the DBMS approach are obtained. This is in contrast to Simonetti, who uses an external topological map. In the current invention, there are no artificial limits on the numbers of hierarchies, the number of levels in a hierarchy, or the number of hierarchies in which a record in any relation may simultaneously participate. In addition, a record may participate multiple times as a child in a hierarchy and at any number of levels within any hierarchy. This is in contrast to Millett who limits the number of levels in the hierarchy or the number of hierarchies. The current invention permits relational access to the underlying data: All relational data records participating in hierarchies are accessible via the standard SQL relational query mechanism. This is in contrast to Sacks, where a Hierarchical DataBase may coexist with a Relational DataBase since both are supported by a Relational DataBase Management System, but access to the Relational DataBase via Hierarchical views or access to the Hierarchical DataBase via Relational views is not possible. In an applications environment that employs Relational DataBases, the Hierarchical views provided by the current invention may be introduced without disruption to or reprogramming of existing applications. And finally, the present invention implementation is simple, straightforward and robust.

REFERENCES CITED IN DESCRIPTION OF PRIOR ART

[Astrahan,1976]
Astrahan, M. M., M. W. Blasgen, D. D. Chamberlin, K. P. Eswaran, J. N. Gray, P. P. Griffiths, W. F. King, R. A. Lorie, P. R. McJones, J. W. Mehl, G. R. Putzolu, I. L. Traiger, B. W. Wade, V. Watson, "System R", ACM Transactions on Database Systems (TODS), June 1976.

[Booch, 1983]
Booch, Grady, "Software Engineering with Ada", Benjamin-Cummings Publishing Company, Inc., Menlo Park, Calif., 1983.

[CODASYL, 1969]
CODASYL Systems Committee, "A survey of generalized data base management systems," Technical Report, May 1969.

[CODASYL, 1971]
CODASYL Systems Committee, "Feature analysis of generalized data base management systems," Technical Report, May 1971.

[Codd, 1970]
Codd, E. F., "A Relational Model of Data for Large Shared Data Banks," Communications of the ACM, vol. 13, no. 6, pp. 377-387, June 1970.

[Date, 1986]
Date, C. J., "An introduction to Database systems, 3rd Edition", Reading, Mass., Addison-Wesley, 1986.

[Jagadish, 1989]
Jagadish, H. V., "Incorporating hierarchy in a relational model of data", Proceeding of 1989 International SIGMOD Conference, pp. 78-87, ACM, 1989.

[ISO/SQL, 1999]
International Organization of Standardization (ISO), Database Language SQL, ANSI/ISO/IEC 9075-2-1999

[Lippman, 1991]
Lippman, S. B., "C++ Primer", Addison-Wesley, 1991

[Millet, 1999]
Millet, Ido, "Accommodating Hierarchies in Relational Databases", in Developing quality complex database systems: Practices, techniques and technologies, Idea Group Publishing, Hershey, Pa., USA, pp. 194-209.

[Stonebraker, 1976]
Stonebraker, M., "The Design and Implementation of Ingres," ACM Transactions on Database Systems, September 1976.

BRIEF SUMMARY OF THE INVENTION

The object of the present invention is to provide a method for representing hierarchical organizations of data in a Relational DataBase. The method is called the Method of Recursive Objects. The invention consists of a main embodiment and three alternate embodiments, all of which are schema designs using the Relational Model of Data. Each embodiment provides for the construction of a building block unit called an aggregate to construct a two level hierarchy. One aggregate links one parent record to zero or more child records. When the child record of one aggregate is the parent record of another aggregate, the aggregates may be combined and composed to produce a three level hierarchy. By extension, hierarchies of any desired level may be constructed.

It is a feature of the present invention that the implementation can be contained entirely within a Relational DataBase and completely managed by an industry standard SQL Relational DataBase Management System. The present invention employs the Relational Model of Data as expressed by the current standard SQL query language without extensions or modifications, and without introducing any new data types. Implementations are portable across all industry standard SQL Relational DataBase Management Systems.

It is a feature of the present invention that the implementation imposes no restrictions on the number of hierarchies, on the number of aggregates a database record may participate in, the number of times a database record may occur as a child in an aggregate, or the co-occurrence of a database record as both parent record and child record in an aggregate.

Unlike the Prior Art, the present invention may be implemented in an industry standard SQL Relational DataBase Management System without the use of external files. The advantage this confers is that all data involved in implementations of the present inventions are managed by the Relational DataBase Management System and therefore gain all the benefits provided by the DataBase Management System. That typically will include security, reliability, shared access, privacy, transaction processing, backup and recovery.

Unlike the Prior Art, the present invention imposes no limits on the hierarchies which may be defined. In its four embodiments, it may be applied to the representation of hierarchies over multiple relations in a single Relational DataBase. It may be applied to the representation of directed graphs over a single relation in a Relational DataBase. It may be applied to the representation of arbitrary hierarchies of enumerated typed records. It may be applied to the representation of arbitrary hierarchies over data records in different Relational DataBase relations distributed over networks of Relational DBMS Servers. The advantage this confers is generality to a wide variety of applications.

Like the Prior Art, the present invention may be used to construct new, Hierarchical DataBases. Unlike the Prior Art, the present invention may also be used in the construction of hierarchical views over existing Relational DataBases requiring only unintrusive read access to the underlying relations. As a consequence and advantage, existing applications against those Relational DataBases can continue to operate without modification. New applications using the Hierarchical Views may be created with absolutely no impact on applications already in operation against the original, Relational DataBase.

The present invention is simple and robust.

BRIEF DESCRIPTION OF SEVERAL VIEWS OF THE DRAWINGS

FIG. 2 provides the SQL statements to define the four relations of the Main Embodiment.

FIG. 3 provides SQL statements to define four relations for Example 1, an aggregate (two level hierarchy) linking Teams to Players.

FIG. 4 shows four relational tables with sample data for Example 1.

FIG. 6 provides SQL statements to define three relations for Example 2. When added to the four relations of Example 1, a three level League-Team-Player hierarchy is created.

FIG. 7 shows three relational tables with sample data for Example 2.

FIG. 10 provides SQL statements to define the three relations of Alternate Embodiment #1.

FIG. 11 provides SQL statements to define three relations for Example 3 according to Alternate Embodiment #1.

FIG. 12 shows sample data for Example 3 in tabular form.

FIG. 15 provides SQL statements to define the six relations in Alternate Embodiment #2.

DETAILED DESCRIPTION OF THE INVENTION

The present invention is called the Method of Recursive Objects and consists of schema designs for linking one record in a parent record class to zero or more records in a child record class into a two level hierarchy called an aggregate. When a child record in one aggregate is the parent record in a second aggregate, the combination of the two aggregates is interpreted as a three level hierarchy. By extension, hierarchies of any number of levels over any combination of object record classes may be defined. The Method of Recursive Objects represents arbitrary hierarchies and related data organization structures using an industry standard SQL Relational DataBase to implement the four embodiments of an aggregate.

Figure 1:
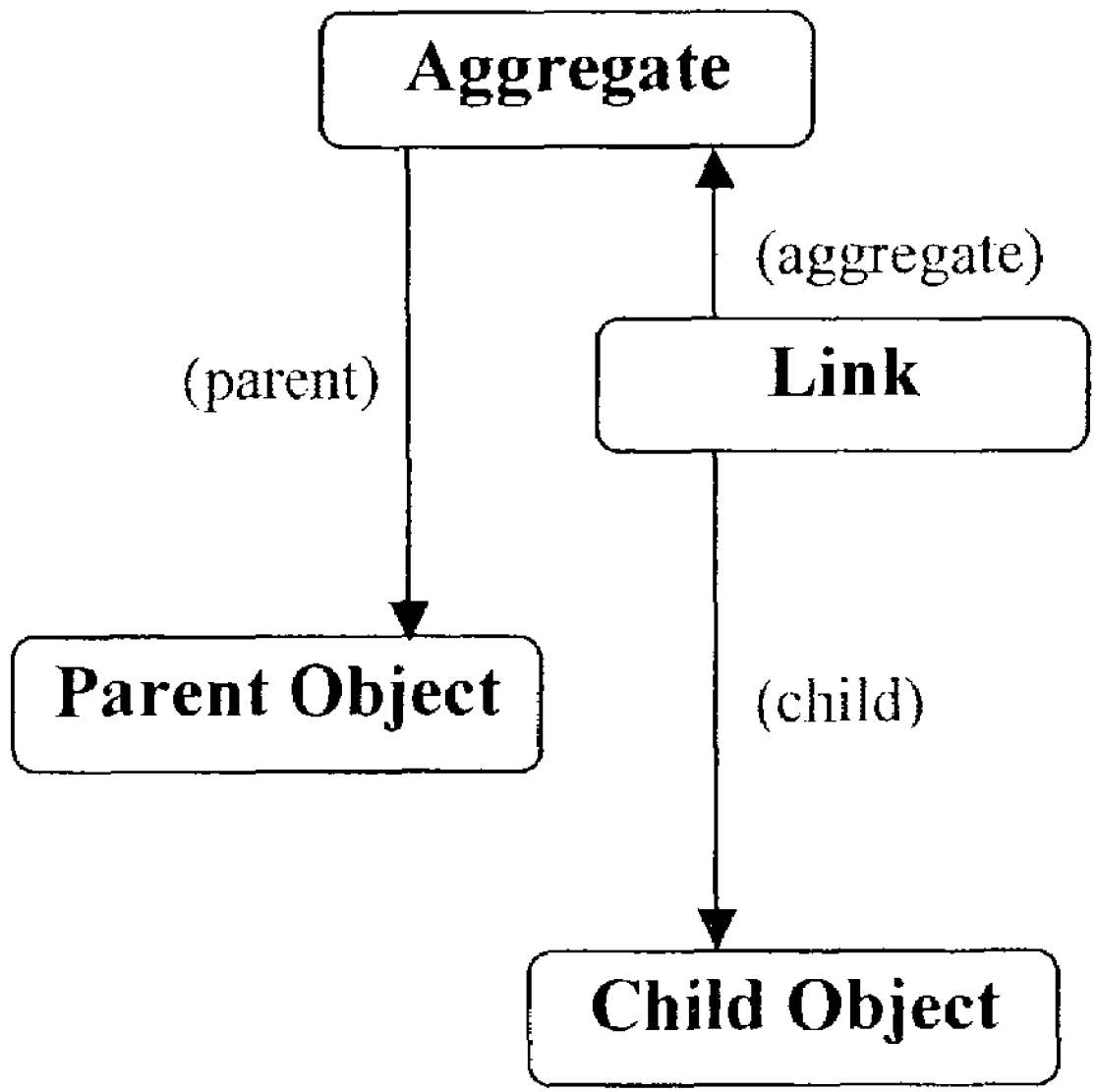
FIG. 1 shows a four relation schema diagram for representing aggregates (two hierarchies) according to the Main Embodiment.

The Main Embodiment of the Method of Recursive Objects is the four relation schema design illustrated in FIG. 1. These schema diagrams and the implied organization of data records within relations will be familiar to persons of ordinary skill in the pertinent art of Relational DataBase design, and in the development of software applications involving access to Relational DataBases. Such persons will recognize that the schema diagrams contained herein depict relations and relationships between relations, and that relation names and field names are chosen for clarity of exposition. The schema designs of the Method of Recursive Objects are independent of the choice of relation and field names made by all those who would implement the Method.

FIG. 1 defines a schema organization for the Main Embodiment consisting of four relations: The ParentObject relation contains records which may fill the role of parent record in an aggregate. The ChildObject relation contains records which may fill the role of child record(s) in an aggregate. The Aggregate relation contains aggregate records each of which represents an aggregate. An aggregate record points to a single parent record in ParentObject relation. The Link relation completes the construction of aggregates. The Link relation contains link records, each with two pointers, one pointing to the aggregate in the Aggregate relation and the other pointing to a child record in the ChildObject relation. Notice that there are no pointers from the Aggregate relation to the ChildObject relation, nor from the Link relation to the ParentObject relation. This separation of pointers into individual relations is an essential feature of the Method of Recursive Objects and differentiates the Method of Recursive Objects from the Prior Art.

The FIG. 1 schema diagram shows four relations and those pointers that are essential to the Method. That is, the ParentObject, ChildObject, Aggregate and Link relations, and the pointer fields from Aggregate to ParentObject, from Link to Aggregate, and from Link to ChildObject.

FIG. 2 provides prototype SQL statements to define the four relations for the Main Embodiment schema diagram of FIG. 1. Only required fields and pointers in the Aggregate and Link relations are shown. A person skilled in the pertinent art would appreciate that additional fields may be added to the schemas. For example, fields could be added to the ParentObject and ChildObject record schemas to describe and characterize the objects each represents. And that an aggregate name field may be added to the Aggregate relation schema for clarity. And that a primary key link id field may be added to the link relation schema for performance. None of these additional fields changes the fundamental spirit of the Method of Recursive Objects. Example 1 illustrates aggregate definition and includes added fields.

EXAMPLE 1

Figure 5:
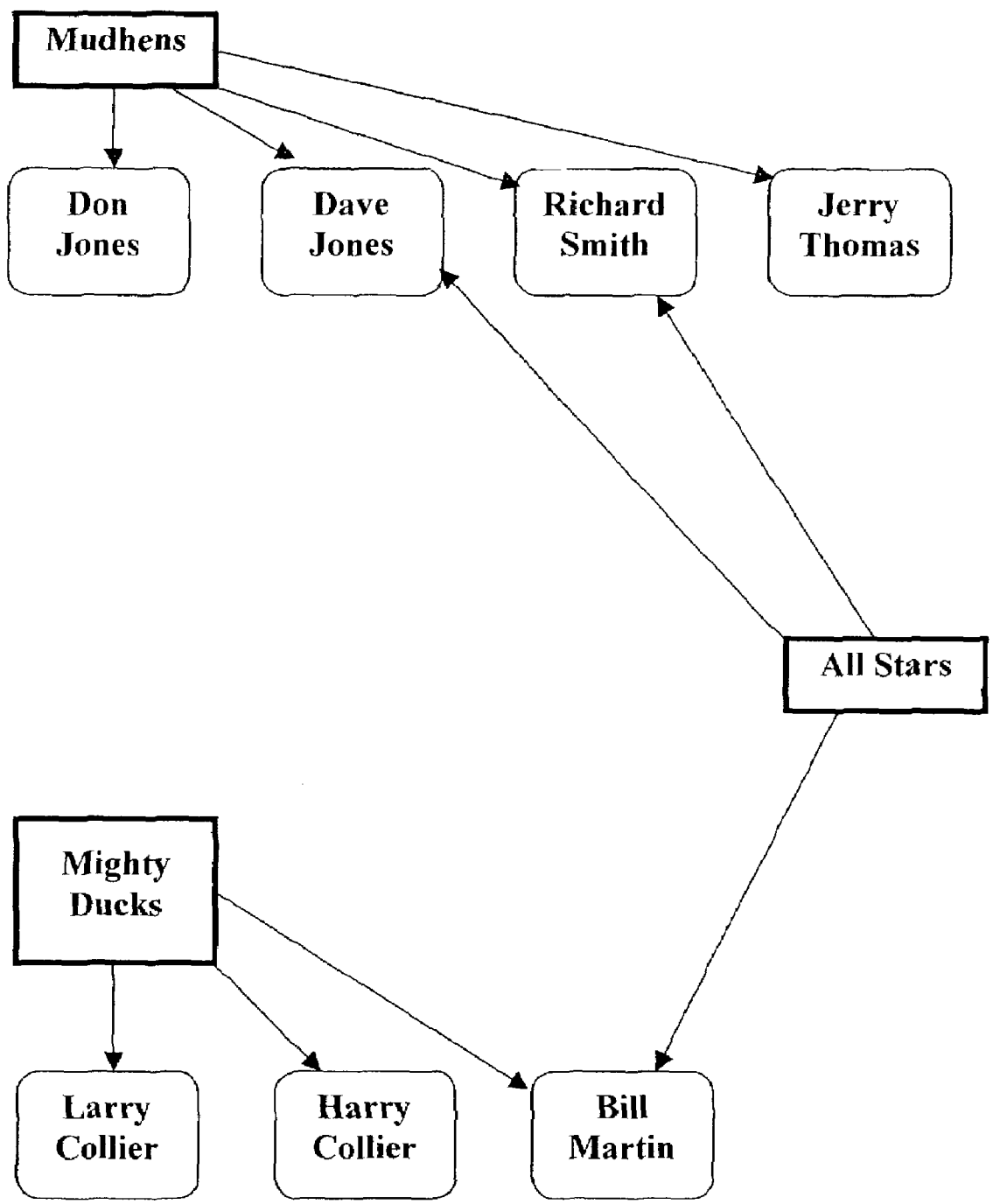
FIG. 5 shows a graphical depiction of the two level Team-Player hierarchy of Example 1 using the data of FIG. 4.

Construction of Team-Player aggregates. Let the Team relation represent teams (or team objects) acting in the role of the ParentObject relation. Let the Player relation represent players (or player objects) acting in the role of the ChildObject relation. The Team relation schema includes fields for the City in which the team plays and the team's mascot. The Player relation includes field values for the player's date and place of birth. FIG. 3 shows the SQL statements to define the four relations for Example 1 including these additional fields. FIG. 4 shows sample data for Example 1 in tabular form. FIG. 5 shows a graphical representation of the two level hierarchy of Example 1. Note in FIGS. 4 and 5 that a child Object may be a child in more than one aggregate. Example 1 contains three hierarchies corresponding to the three aggregates, Mudhens Roster, Mighty Ducks Roster and All Stars.

EXAMPLE 2

Figure 8:
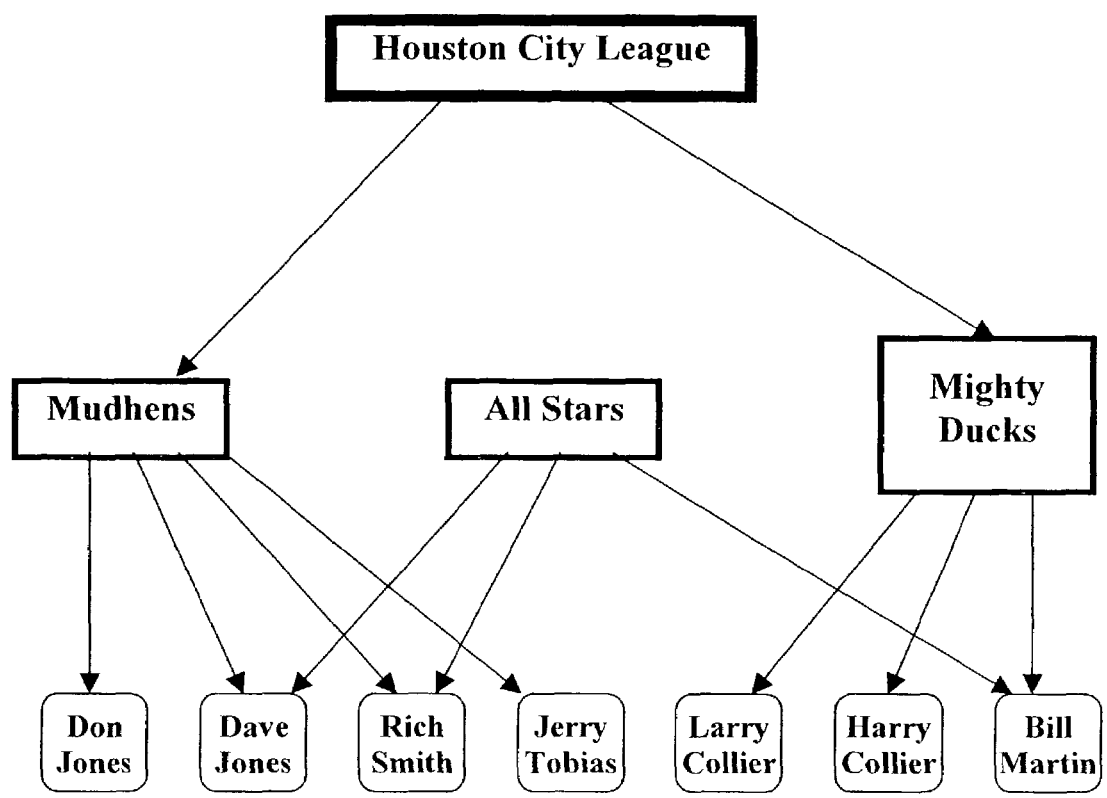
FIG. 8 shows a graphical depiction of the three level hierarchy of Example 2 using the data of FIG. 7.

To extend the aggregates (two level hierarchies) of Example 1 into a three level hierarchy, a new relation (League) is added plus a new Aggregate relation (LeagueTeamAggregate) and a new Link relation (LeagueTeamLink). FIG. 6 shows the SQL statements to define the additional relations. FIG. 7 shows additional sample data for Example 2 in tabular form. FIG. 8 shows the three level hierarchy of Example 2 in graphical form.

Note the following features of the Main Embodiment:
A parent record may be the parent record in any number of aggregates.
A child record may fulfill the role of child in any number of aggregates.
A child record may fulfill the role of child zero or more times within an aggregate. The implementer may choose to prevent multiple occurrences of a child record in an aggregate by software, through the use of unique keys in the schema definition, software or some other mechanism.
Schemas for the Aggregate relation and Link relation in FIG. 1 are specific to the Parent Object and Child Object relations. To define and instantiate an arbitrary hierarchy, one Aggregate relation and one Link relation are required for each pair of relations for which the representation of a parent-child relationship (i.e., an aggregate) is required.

Although the composite structure of aggregates is said to form a hierarchy, there are no restrictions on closed paths or cycles within the structure. It would therefore be more correct to equate the structures assembled from aggregates to lattice structures rather than to hierarchical structure. Hierarchical structures are a subset of lattice structures. Persons skilled in the pertinent art could use the Method of Recursive Objects to implement lattices, or, could enforce a hierarchical structure through detection and prohibition via software, database constraints or some other mechanism of closed loops or cycles.

Detailed Description of the Alternate Embodiment #1

Figure 9:
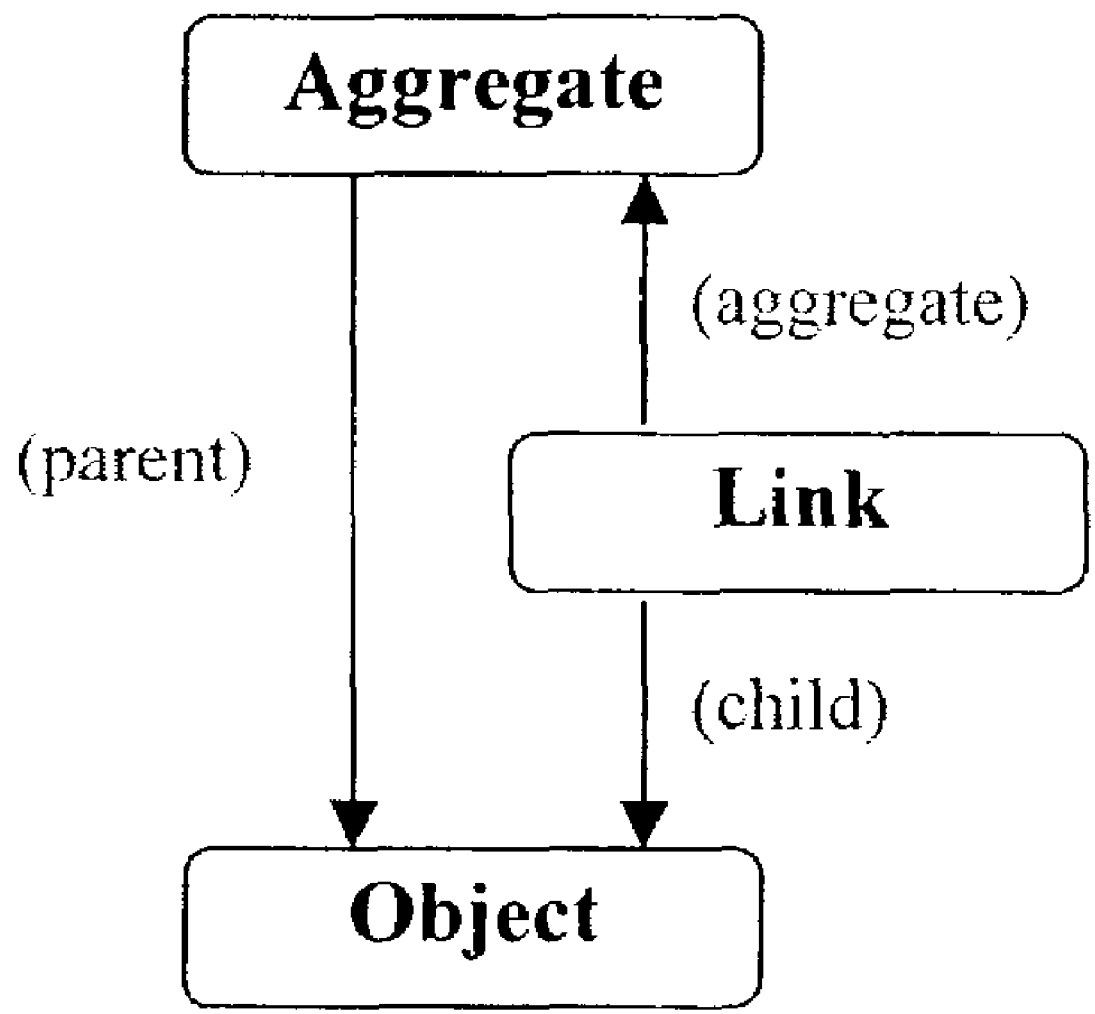
FIG. 9 shows Alternate Embodiment #1, a special case of the Main Embodiment in which the ParentObject relation and ChildObject relation are the same.

Embodiment #1 of the Method of Recursive Objects is the three relation schema design illustrated in FIG. 9. FIG. 9 defines a schema organization consisting of three relations: The Object relation contains records which may fill the role of parent and child records in an aggregate. The Aggregate relation contains aggregate records, each of which represents one aggregate and contains a pointer to the parent record in the Object relation. The Link relation completes the construction. The Link relation contains Link records with two pointers, one which points to an aggregate record in the Aggregate relation and the other which points to a child record in the Object relation. Alternate Embodiment #1 differs from the Main Embodiment only insofar as the ParentObject relation and ChildObject relation are the single relation specified as Object in FIG. 9 and defined in FIG. 10. SQL statements to define all three relations for Alternate Embodiment #1 are given in FIG. 10. Alternate Embodiment #1 represents a specialization of the Main Embodiment in which all parent and child records are drawn from a single class, the Object relation. This schema design permits exactly the same hierarchical structures as the Main Embodiment, but persons skilled in the pertinent art will recognize that if multiple occurrences of any one record as parent record in an aggregate are prohibited and multiple occurrences of any one record as child record in an aggregate are prohibited, and aggregates where the child record and parent record are identical are prohibited, then the resulting structures are equivalent to directed graphs over the records in the Object relation.

EXAMPLE 3

Figure 13:
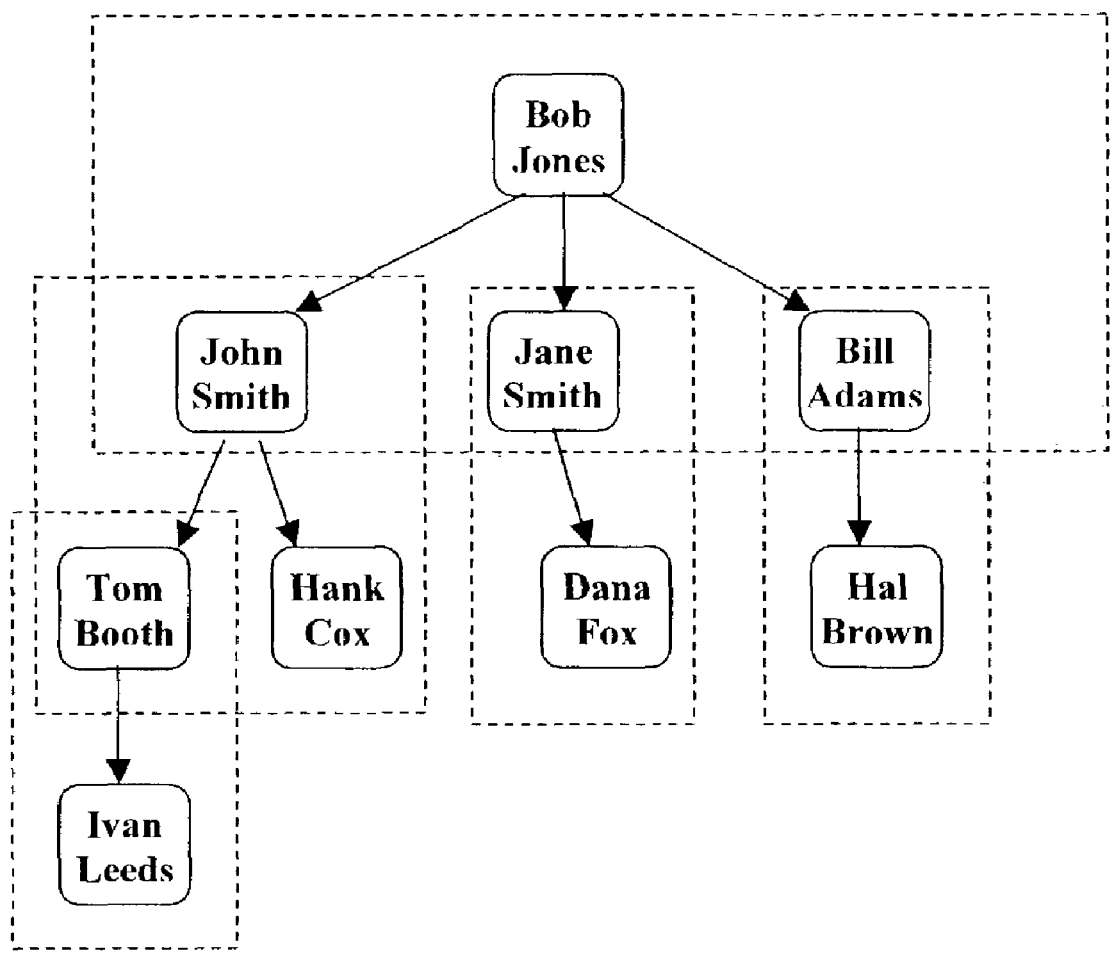
FIG. 13 shows the directed graph equivalent for Example 3 using the sample data from FIG. 12.

A digraph representation of an Organization Chart. Let the set of record objects be the Employees of Company X. Company X is organized into Groups, each of which has one Employee leader (parent role) and zero or more Employee members (child role). FIG. 11 shows the SQL statements to define the three relations according to Alternate Embodiment #1. FIG. 12 shows sample data for Example 3 with 9 Employees organized into five groups. FIG. 13 provides a graphical depiction of the Organization Chart of Example 3.

Many applications employ directed graphs as data structure. With Alternate Embodiment #1, it is possible to completely represent directed graphs over a single relation using a Relational DataBase Management System. Unlike the Prior Art, the Method of Recursive Objects is entirely implemented within a RDBMS without the use of any external data or files.

Note the following features of Alternate Embodiment #1:
Parent and child records are drawn from a single record class corresponding to the Object relation.
A record may be the parent record in any number of aggregates and a record may have multiple occurrences as a child in an aggregate. The resulting structure will represent a digraph only if records are restricted to being the parent record in at most one aggregate and if records are restricted to at most one occurrence as a child in any aggregate and if records are restricted so that an aggregate may not have the same record as both parent and child.

Schemas for the Aggregate relation and Link relation in FIG. 9 are specific to a single digraph. For each digraph, a separate pair of Aggregate and Link relations is required.

Detailed Description of the Alternate Embodiment #2

Figure 14:
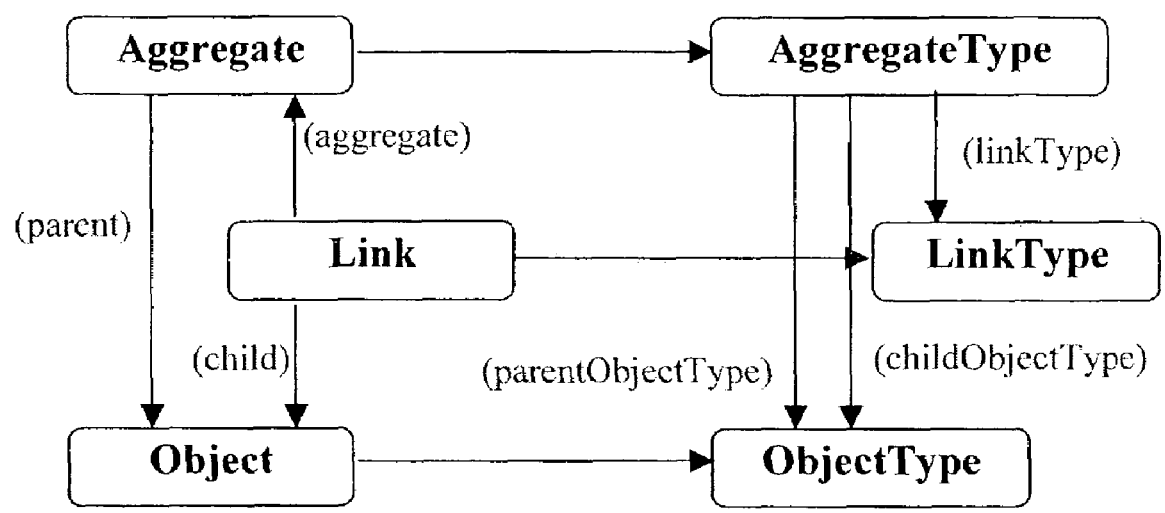
FIG. 14 shows a schema diagram for Alternate Embodiment #2.

Alternate Embodiment #2 of the Method of Recursive Objects is the six relation schema design illustrated in FIG. 14. Alternate Embodiment #2 represents a variation on Alternate Embodiment #1 in which the Method of Recursive Objects is used to create arbitrary hierarchies over records drawn from a single Object relation whose objects (i.e., records, rows, tuples) are partitioned into object types enumerated in the ObjectType relation. Each object record in the Object relation specifies its object type using a pointer to an object type record in the ObjectType relation. In addition to using object types to classify objects, Alternate Embodiment #2 partitions aggregates into typed classes according to an enumerated set of aggregate types in the AggregateType relation, and partitions Links into typed classes according to an enumerated set of link types in the LinkType relation. Alternative Embodiment #2 is similar to the Main Embodiment in that it can represent arbitrary hierarchies over typed classes, but achieves this using enumerated types for objects. This is in contrast to the Main Embodiment where membership in different database relations determines membership in either the parent class (ParentObject relation) or the child class (ChildObject relation) in FIG. 1.

FIG. 14 defines a schema organization consisting of six relations for Alternate Embodiment #2. In FIG. 14:

Each record of the Object relation points to an object type in the ObjectType relation;

Each record of the Link relation points to a link type in the LinkType relation;

Each record of the Aggregate relation points to an aggregate type in the AggregateType relation;

Each aggregate type record in the AggregateType relation specifies (points to) one parent object type record in the ObjectType relation, one child object type record in the ObjectType relation, and one link type record in the LinkType relation. An aggregate (record) which points to this aggregate type (record) must connect parent and child objects (records) of the prescribed types using a link (record) of the prescribed type. This is enforced by integrity constraints or software or some other mechanism.

The SQL statements to define the six relations of Alternate Embodiment #2 in FIG. 14 are shown in FIG. 15.

Alternate Embodiment #2 provides a powerful means for constructing arbitrary hierarchies over nonhomogeneous objects using only six relations. It is often possible to superimpose hierarchies over an existing Object relation where the Object relation schema includes a field value that partitions the set of Objects. In that case, the ObjectType relation captures these type values (types) and the aggregate type defines the desired parent-child relationships between the object types and the link type.

Figure 16:
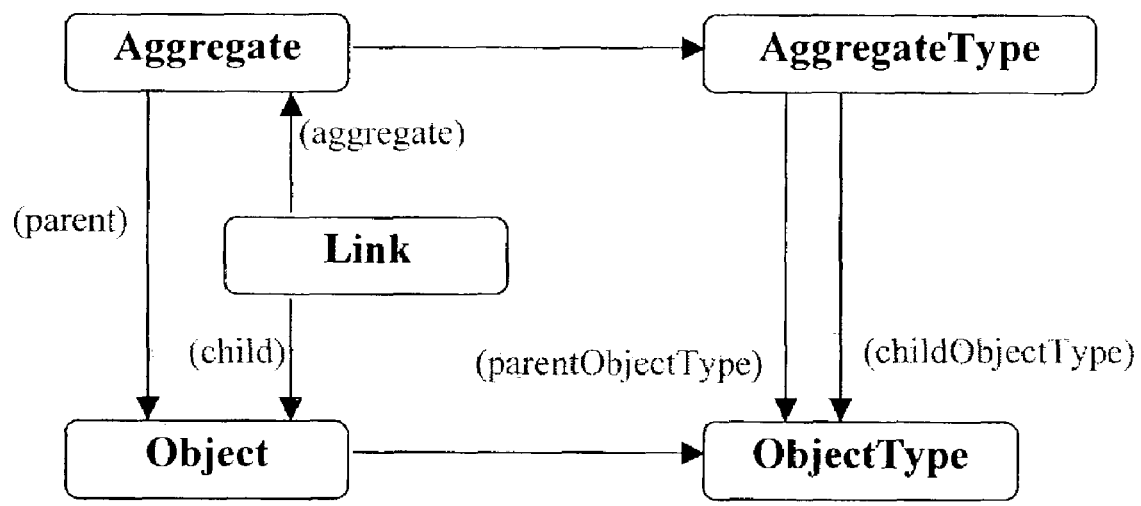
FIG. 16 shows a schema diagram for Alternate Embodiment #2 without the LinkType relation.
Figure 17:
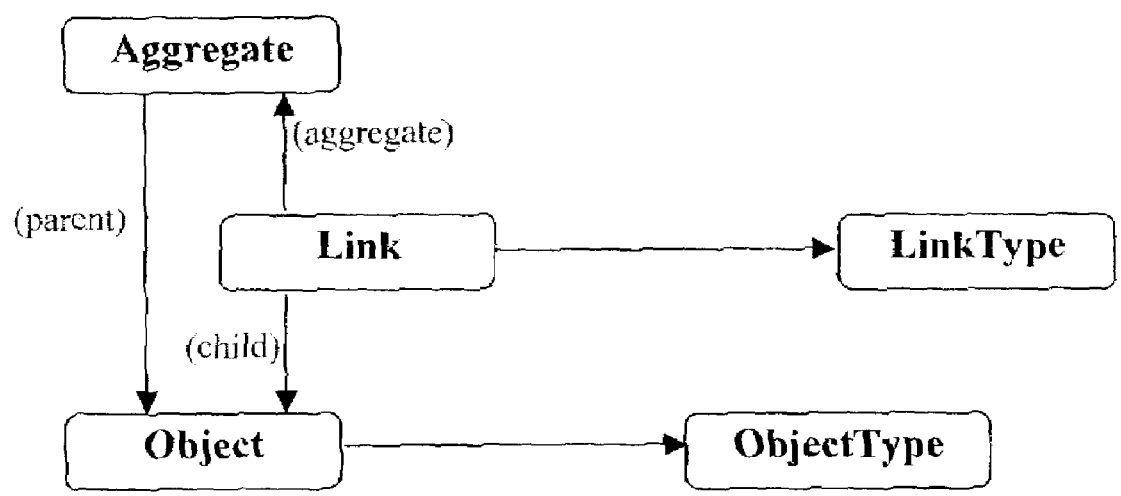
FIG. 17 shows a schema diagram for Alternate Embodiment #2 without the AggregateType relation.
Figure 18:
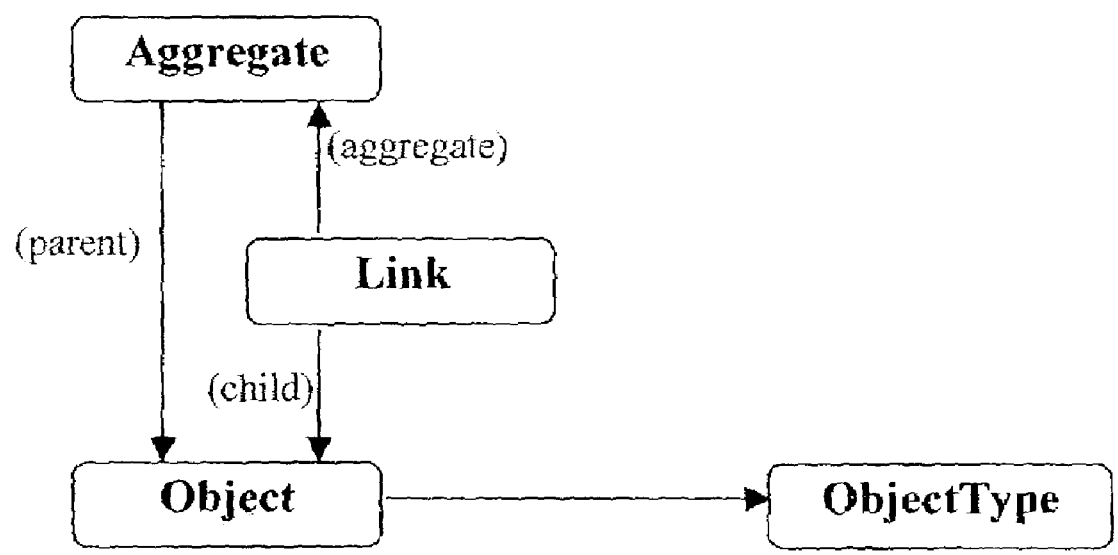
FIG. 18 shows a schema diagram for Alternate Embodiment #2 without both the LinkType and AggregateType relations.

The enumerated type relations for aggregates (i.e., AggregateType) and for links (i.e., LinkType) provide an extra measure of strong typing that applications or interface software can enforce for internal consistency. Either or both the AggregateType and the LinkType relations may be omitted along with the corresponding pointers from the Aggregate and Link relations. The resulting schema designs lack the strong typing mechanism of FIG. 14, but are still implementations of Alternate Embodiment #2. FIG. 16 shows Alternate Embodiment #2 with the LinkType relation and pointer from Link to LinkType omitted. FIG. 17 shows Alternate Embodiment #2 with the AggregateType relation and pointer from Aggregate to AggregateType omitted. FIG. 18 shows Alternate Embodiment #2 with both the LinkType and AggregateType relations omitted, as well as omitting the pointer from Link to LinkType and the pointer from Aggregate to AggregateType.

Detailed Description of the Alternate Embodiment #3

Figure 19:
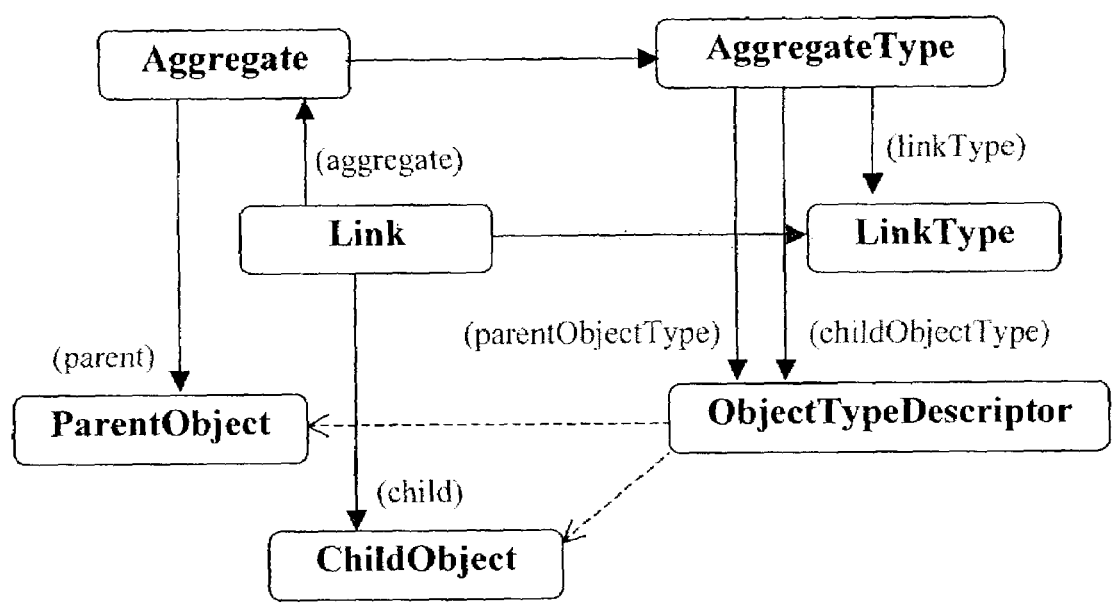
FIG. 19 shows a schema diagram for Alternate Embodiment #3.

Alternate Embodiment #3 of the Method of Recursive Objects is the seven relation schema organization illustrated in FIG. 19. Alternate Embodiment #3 incorporates the structure of the Main Embodiment with the type mechanism of Alternate Embodiment #2. The left side of FIG. 19 is identical to the schema of FIG. 1 (Main Embodiment). The right side of FIG. 19 is analogous to the typing mechanism on the right side of FIG. 14, the schema design for Alternate Embodiment #2. As in FIG. 14, an aggregate points to an aggregate type record in the AggregateType relation and a Link points to a link type record in the LinkType relation. The aggregate type of the aggregate specifies the link type, so that only link records of the correct type may be used. In Alternate Embodiment #3, the ParentObject relation and the ChildObject relation are not required to exist in the same Relational DataBase. Instead: They may be any relations in any Relational DataBases managed by any Relational Server on a network. The only requirement is that they be accessable with read permission. The network may be a local area net (LAN), or it may be a wide area net (WAN) such as the Internet. The ObjectTypeDescriptor of FIG. 19 serves as a type classification mechanism just as ObjectType in Alternate Embodiment #2, but neither the ParentObject relation nor the ChildObject relation in FIG. 19 contains any pointers to object type descriptor records in the ObjectTypeDescriptor relation. Instead, the ObjectTypeDescriptor records provide the information necessary to retrieve a record from an Object relation (Parent, or Child) by specifying the network address of the host Relational Server, the name and owner of the Relational DataBase, the name of the relation, and fields of the relation (ParentObject or ChildObject) used to implement the pointers from the aggregate and link records. A person skilled in the pertinent art will recognize that for the Aggregate relation and Link relation to point to records in relations on the network, the pointers must be interpreted as unique network addresses. The fields specified in the ObjectTypeDescriptor relation are combined with either the parent record pointer in an aggregate record or the child record pointer in a link record to produce a network address which uniquely identifies the parent record or child record in the correct relation in the network.

Because Alternate Embodiment #3 does not require pointers from the ParentObject or ChildObject relations, the Method of Recursive Objects can be implemented over all relations in all Relational DataBases managed by all Relational Servers in a network without modification to any of their schemas and without data modification to any of the participating records. (That is, with only read access permission.) Alternate Embodiment #3 therefore allows for the construction of arbitrary hierarchies across all relations residing on all network Relational Servers. The Prior Art contains no known method for constructing equivalent structures using a Relational DataBase and Relational DataBase Management Systems as the implementing apparatus.

CONCLUSION, RAMIFICATION AND SCOPE

The present invention provides a mechanism for implementing the Method of Recursive Objects for the representation of several variations of arbitrary hierarchies. These include hierarchies over classes defined by relations, digraphs over the records of any single relation, hierarchies over records of any single relation partitioned by enumerated types, and hierarchies over classes defined by relations stored on any Relational Server in a network.

In all 4 embodiments, the Aggregate relation and Link relation combine to provide aggregates, which are the building blocks for hierarchies. In general, the child records in a hierarchy are unordered. Persons skilled in the pertinent art will understand that a retrieval order can be imposed on the child records by providing a suitable field in the relational schema of the Link relation. Examples include a datetime field for time ordering or an integer or floating point field for numeric ordering. The presence of such fields does not alter the spirit and scope of the invention. The essential new aspect of the present invention is the aggregate and the four embodiments of an aggregate using only relations in a Relational DataBase. It will be understood by those skilled in the pertinent art that the relation names and fields names may be chosen by the implementer and new fields added without departing from the spirit and scope of the invention.

What is claimed is:

1. A method of recursive objects for constructing a representation of at least a first two-level hierarchy in a database of a Relational Database Management System (RDBMS) associating a parent record in a parent table in said database with a first plurality of child records in a child table in said database, said parent table containing a plurality of parent records each having a plurality of fields including a uniquely valued parent record identity field and each child record in said plurality of child records having a plurality of fields including a uniquely valued child record identity field, comprising the steps of:
   (a) creating an aggregate table in said database for inserting aggregate records having a plurality of fields including at least a uniquely valued aggregate record identity field and a parent record identifier field for identifying a parent record;
   (b) creating a link table in said database for inserting link records having a plurality of fields including at least a uniquely valued link record identity field, an aggregate record identifier field for identifying an aggregate record and a child record identifier field for identifying a child record;
   (c) constructing the representation of said first two-level hierarchy by:
      (i) inserting a first aggregate record into said aggregate table with said aggregate record identity field set to a unique first aggregate record identity value and said parent record identifier field set to the value of said parent record identity field in said parent record;
      (ii) following step (c)(i), inserting a plurality of link records into said link table, one link record for each child record in said first plurality of child records with the respective value of said link record identity field set to a unique link record identity value, the respective value of said aggregate record identifier field set to said first aggregate record identity value and the respective value of said child record identifier field set to the value of said child record identity field of the respective child record, wherein the association of said first aggregate record with said parent record and the association of each link record with both said first aggregate record and the respective child record associates said parent record with the respective child record in said first two-level hierarchy, whereby said parent record is associated with said first plurality of child records in said first two-level hierarchy, and
   (d) retrieving all associations of one parent record and one child record associated in said first two-level hierarchy using a first query over said parent table, said aggregate table, said link table and said child table, said first query restricting retrieval to all associations of one parent record and one child record associated by an aggregate record and an associated link record.

2. The method of claim 1, comprising the further steps of:
   (e) constructing the representation of a second two-level hierarchy associating said parent record in said parent table with a second plurality of child records in said child table by:
      (iii) inserting a second aggregate record into said aggregate table with said aggregate record identity field set to a unique second aggregate record identity value and said parent record identifier field set to the value of said parent record identity field in said parent record, and;
      (iv) following step (e)(iii), inserting a plurality of link records into said link table, one link record for each child record in said second plurality of child records with the respective value of said link record identity field set to a unique link record identity value, the respective value of said aggregate record identifier field set to said second aggregate record identity value and the respective value of said child record identifier field set to the value of said child record identity field of the respective child record, wherein the association of said second aggregate record with said parent record and the association of each link record with both said second aggregate record and the respective child record associates said parent record with the respective child record in said second two-level hierarchy, whereby said parent record is associated with said second plurality of child records in said second two-level hierarchy.

* * * * *